United States Patent Office 3,135,333
Patented June 2, 1964

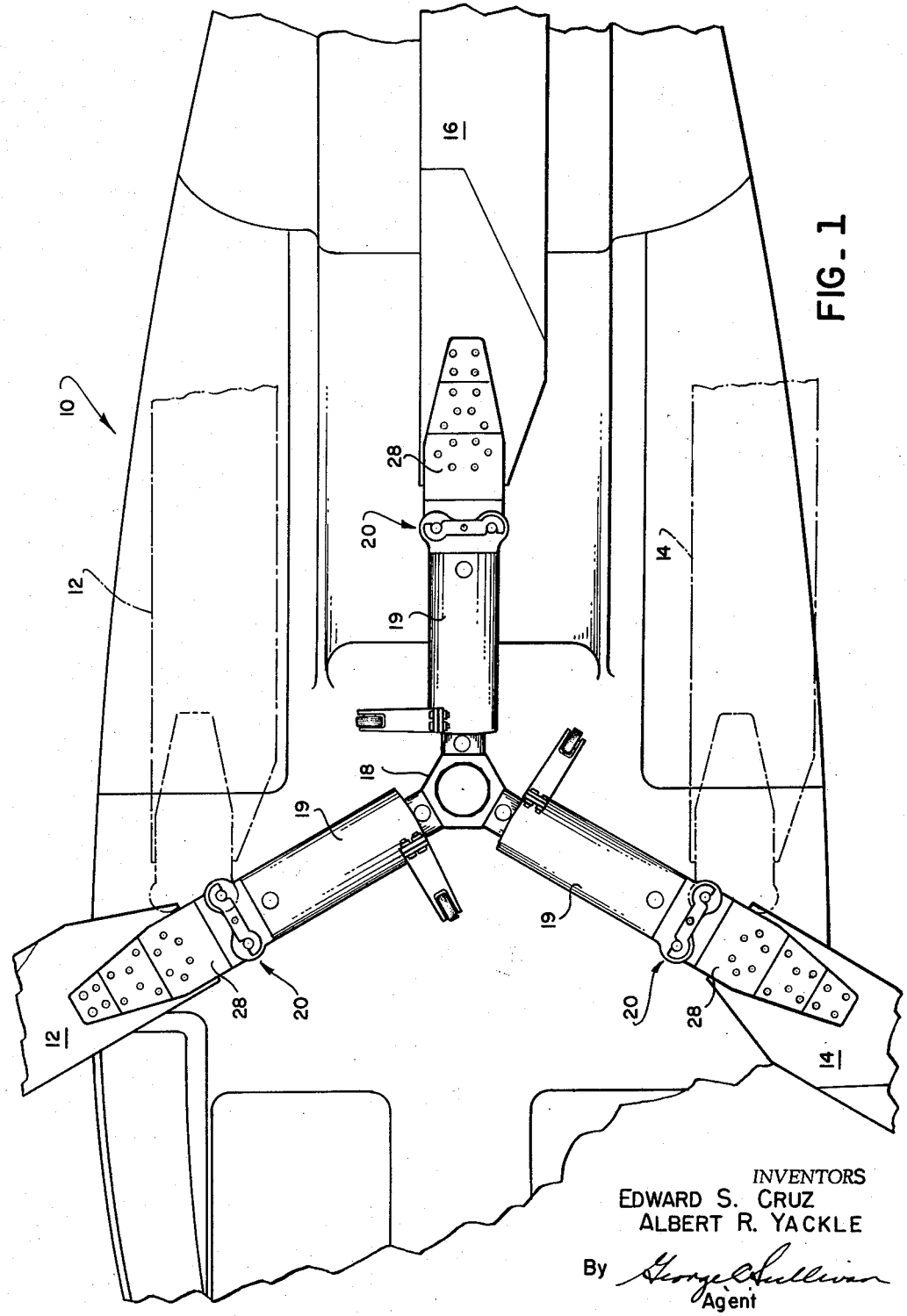

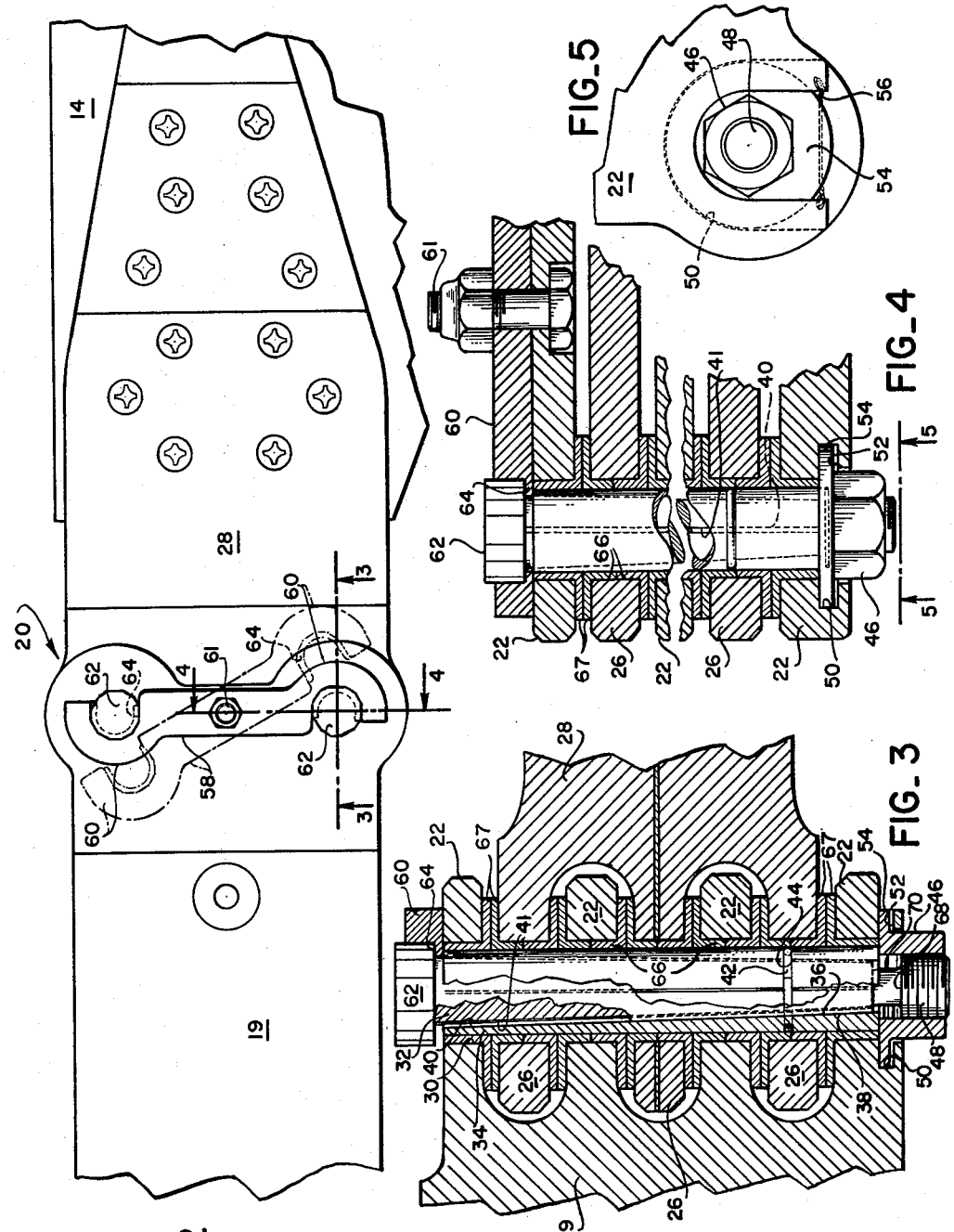

3,135,333
FOLDING ROTOR BLADE
Edward S. Cruz, Van Nuys, and Albert R. Yackle, East Woodland Hills, Calif., assignors to Lockheed Aircraft Corporation, Burbank, Calif.
Filed Oct. 15, 1962, Ser. No. 230,363
3 Claims. (Cl. 170—160.12)

This invention relates to a folding rotor blade for a helicopter.

Previously proposed folding rotor blades have utilized folding hinges comprised of taper pins or bolts inserted into interlocking lugs or ears on the rotor hub member and the rotor blade. These hinges require special tools for loosening and removing the taper pins prior to blade folding. Also, the blade may be inadvertently folded about a taper pin which has not been sufficiently loosened, resulting in possible damage to the pin and to the rotor hub member and blade root fitting. Other disadvantages of these taper pin joints are the high cost of machining the blade attachment fittings for receiving the taper pin and the difficulty of standardizing such pins and fittings for production. Accordingly, it is a general object of the present invention to provide an improved taper pin joint for rotor blade attachment and folding which overcomes the aforementioned difficulties and shortcomings.

Generally stated, the present invention utilizes a taper pin or bolt assembly which is comprised of a taper bolt and a sleeve which is internally tapered to mate with the tapered surface of the bolt. The sleeve is longitudinally split into two sections of semi-circular cross-section, which are keyed and fastened to the bolt to form an integral unit therewith. By use of this assembly, the expensive machining of tapered surfaces on the attachment fittings is avoided since the assembly can be inserted into a standard circular hole in the fittings. The tight fit which is characteristic of taper pin joints is obtained by drawing up the present bolt on suitable nut means, which causes expansion of the sleeve in the bolt opening. The present invention also provides for a locking device which prevents blade folding until all bolt assemblies have been loosened, thereby avoiding possible damage to the pin and fittings.

These and other features of the present invention will become more apparent when the following detailed description is taken in conjunction with the accompanying drawings wherein:

FIGURE 1 is a fragmentary, plan view showing a helicopter rotor system incorporating the present invention;

FIGURE 2 is an enlarged, fragmentary, plan view showing a joint in accordance with the present invention;

FIGURE 3 is an elevational, sectional view of the joint taken along the line 3—3 of FIGURE 2;

FIGURE 4 is another elevational, sectional view of the joint, taken along the line 4—4 of FIGURE 2; and FIGURE 5 is a bottom view of the nut means in accordance with the present invention taken along the line 5—5 of FIGURE 4.

FIGURE 1 shows a helicopter 10 with a rotor system having rotor blades 12, 14 and 16 of the cantilever type attached to the rotor hub 18 through rotor cuff members 19, which carry blade pitch changing means. Blade folding is accomplished by aligning one of the blades, for example blade 16, along the longitudinal axis of the helicopter and then folding the other blades 12, 14 into substantially parallel relation with blade 16, as shown in phantom in FIGURE 1, so that the blades are all directed toward the tail from the rotor hub. This presents a compact configuration for storage or transport of the helicopter.

The blades are folded at the joints, generally designated 20 and more clearly shown in FIGURES 2 to 5. Joint 20 includes plural sets, herein two sets, of spaced lugs or ears 22 on the cuff member 19 and corresponding sets of spaced ears 26 on a blade root fitting 28, which is bifurcated to receive a blade, say 14. The respective sets of ears 22 and 26 interlock as shown. These interlocked sets of ears have circular openings 30 to receive the aforementioned taper bolt assembly which comprises a taper bolt 32 and a taper sleeve 34 longitudinally split into two portions of semi-circular cross-section. Sleeve 34 has an internally tapered surface 36 which mates with the tapered surface 38 of the bolt 32. Sleeve 34 is keyed to bolt 32 by means of longitudinal, internal ridges 40 fitting into keyways 41 on the bolt, and is held in cooperating relation with bolt 32 by means of a snap-ring 42 mounted in groove 44. Keying of sleeve 34 to bolt 32 assures that the blade will be rotated on the outer cylindrical surface of the sleeve rather than on the tapered surfaces. However, the keying does not prevent sliding axial movement of the sleeve and bolt, to be described hereinafter.

In addition to economy of manufacture, it will be seen that the present taper bolt assembly provides for a failsafe feature in that the bolt and sleeve can each be designed to take the mechanical loads separately in the event one of them should fail.

For securing the bolt assembly in place, a flanged nut 46 is provided for engaging the threaded end 48 of the bolt. End 48 has a diameter larger than the smallest inside diameter of sleeve 34 for a purpose to be described hereinafter. Lowermost ear 22 on cuff member 19 is provided with a T-slot 50 adapted to receive and hold nut 46 during engaging and disengaging movement of the nut. Slot 50 has an undercut portion 52 adapted to receive flange 54 of the nut. After tightening, nut 46 is prevented from working loose by safety or lock wire means 56 which passes through flange 54 and is tied to ear 22, as shown. By making nut 46 integral with the cuff member 19, two advantages are provided over prior art devices. First, the nut cannot be lost when the bolt is removed from the joint for blade folding, and, second, since the nut is restricted from completely backing off the threaded end 48 of the bolt, disengaging action of the nut causes the bolt to move in the opposite direction, thereby alleviating the snug fit of the bolt assembly in the opening 30 preparatory to blade folding.

To prevent the folding of a blade on a secured bolt assembly, a locking device 58 is provided which has plural, here two, hook-shaped arms 60 centrally pivotable about pin 61 and adapted to engage the bolt heads 62. Heads 62 are provided with serrations which mesh with corresponding serrations on the hooked portion of arms 60 so that in the engaged position bolts 32 are prevented from turning. The hooked portion of arms 60 also has a crescent-shaped lip or projection 64 which is adapted to fit under the bolt head and lie over a portion of the sleeve end when the arms are engaged with the bolt heads. In a manner to be more specifically described hereinafter. projection 64 prevents removal of any of the bolt assemblies from the openings until all of the assemblies have been loosened and the arms can be rotated out of engagement with the bolt heads.

When the bolt assembly and the fittings are made of different metals, for example steel and aluminum respectively, there may be some scoring or galling of the softer metal during the blade folding operation. To prevent this galling, the openings may be provided with flanged bushings 66 made of the same material as the bolt assembly. In this case, the interlocking surfaces of the ears 22 and 26 are adapted to accommodate flanges 67 of the bushings 66, which are arranged as shown in FIGURE 3.

In the operation and use of the present invention, the individual blades 12, 14, 16 are attached to the hub 18 by interlocking the ears 26 of fittings 28 with the corresponding ears 22 of cuff member 19, inserting the taper bolt assemblies in openings 30 in the interlocked sets of ears, and threading the bolt assemblies onto the nuts 46. Then, locking device 58 is rotated, here clockwise, to engage the bolt heads 62 and prevent further turning of bolt assemblies in the openings. Nuts 46 are then turned with a wrench to draw bolts 32 thereon, causing expansion of the sleeves 34 in the openings 30 to provide a snug fit. Locking device 58 is held immobile by the clamping action of bolt heads 62 on projections 64. The nuts are then safety-wired, as previously described.

In removing a bolt assembly preparatory to blade folding, safety wire means 56 is removed and nut 46 is backed off the bolt 32 until flange 54 bottoms on the undercut portion 52 of the T-slot. Further loosening movement of the nut causes the bolt to move away from the nut. Sleeve 34, however, is prevented from moving by projection 64. Loosening of the nut and consequent forward movement of the bolt can be continued until shoulder 68 on the threaded end 48 contacts the sleeve end. Bolt 32 has an unthreaded, cylindrical portion 70 between the tapered portion and threaded end 48 to insure that the tapered surface 36 of the sleeve will not be marred by threads during the loosening operation. At this point, it is not possible for this bolt assembly to be removed from its opening 30 because of projection 64 which overlies sleeve 34. To enable removal of this bolt assembly, the other, or pivotal, bolt assembly must also be loosened, at least to the extent that its bolt head 62 is out of contact with the adjacent projection 64. Locking device 58 can then be rotated counterclockwise to the unlocked position shown in phantom in FIGURE 2. Now, with projection 64 moved out of the way, further loosening of the nut on the first bolt assembly pushes both sleeve 34 and bolt 32 out of the opening, sleeve 34 being moved by shoulder 68 on threaded end 48. The bolt assembly is now readily removed from its opening, whereupon the rotor blade can be folded about the pivotal assembly. It will be apparent that this sequence of operations prevents inadvertent blade folding about a taper pin assembly which has not been previously loosened.

Thus, the present invention provides a taper pin joint for attaching and folding a rotor blade which is economical to manufacture, simple and foolproof in operation, and free of excessive servicing and maintenance.

While a particular embodiment of the invention has been illustrated and described, it will be obvious to those skilled in the art that various changes and modifications may be made without departure from the invention, and it is intended to cover in the appended claims all such modifications and equivalents as fall within the true spirit and scope of the invention.

We claim:

1. A joint for attaching and folding a rotor blade relative to the rotor hub, said joint comprising: a bifurcated blade root fitting for receiving and holding the blade at the bifurcated end; plural sets of spaced ears on the other end of said fitting; a hub cuff member attached to the rotor hub at one end; plural sets of spaced ears on the other end of said cuff member; said sets of ears on the cuff member being complementary to the sets of ears on the fitting and interlocking therewith; a cylindrical opening in each set of interlocked ears; a bolt assembly fitting into each of said openings and comprising a headed taper bolt and a mating split taper sleeve keyed to said bolt, said bolt having a threaded end extending beyond said sleeve; said end having a larger diameter than the smallest inside diameter of the sleeve; nut means for engaging said threaded end and securing the bolt assemblies in said openings for attaching said blade to the cuff member; and a device for interlocking the bolt assemblies to prevent blade folding until all bolt assemblies are loosened, said device being pivotally mounted between the bolt heads and having hook-shaped arms adapted to engage the bolt heads and a projection on the hooked portion of said arms adapted to fit under the bolt heads and to lie over a portion of the sleeve end when the arms are engaged with the bolt heads.

2. A joint according to claim 1, wherein the nut means comprises a flanged nut, a T-slot in the lowermost ear to receive said nut and to permit bolt engaging and disengaging movement of said nut, and safety wire means for said nut.

3. A hinge for a foldable rotor blade comprising: a blade root having plural sets of spaced ears; a rotor hub member having corresponding plural sets of spaced ears which are adapted to interlock with the ears on the root; a cylindrical opening in each set of interlocked ears; a bolt assembly fitting into each of said openings and comprising a headed taper bolt and a mating split taper sleeve keyed to said bolt; nut means for securing the bolt assemblies in said openings; and a device for interlocking said bolt assemblies to prevent blade folding until all bolt assemblies are loosened, said device being pivotally mounted between the bolt heads and having hook-shaped arms adapted to engage the bolt heads and a projection on the hooked portion of said arms adapted to fit under the bolt heads and lie over a portion of the sleeve end when the arms are engaged with the bolt heads.

References Cited in the file of this patent

UNITED STATES PATENTS

| | | |
|---|---|---|
| 1,567,687 | Tomkinson | Dec. 29, 1925 |
| 1,585,532 | Cole et al. | May 18, 1926 |
| 1,880,375 | Davis | Oct. 4, 1932 |
| 2,004,561 | Becker | June 11, 1935 |
| 2,023,840 | Kay et al. | Dec. 10, 1935 |
| 2,358,734 | Pankhurst | Sept. 19, 1944 |
| 2,447,118 | Gluhareff | Aug. 17, 1948 |
| 3,065,513 | Warner et al. | Nov. 27, 1962 |